(12) United States Patent
Noyel et al.

(10) Patent No.: US 9,189,841 B2
(45) Date of Patent: Nov. 17, 2015

(54) METHOD OF CHECKING THE APPEARANCE OF THE SURFACE OF A TYRE

(71) Applicants: Guillaume Noyel, Clermont-Ferrand (FR); Dominique Jeulin, Fontainebleau (FR); Estelle Parra-Denis, Fontainebleau (FR); Michel Bilodeau, Fontainebleau (FR)

(72) Inventors: Guillaume Noyel, Clermont-Ferrand (FR); Dominique Jeulin, Fontainebleau (FR); Estelle Parra-Denis, Fontainebleau (FR); Michel Bilodeau, Fontainebleau (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 90 days.

(21) Appl. No.: 14/348,156

(22) PCT Filed: Sep. 27, 2012

(86) PCT No.: PCT/EP2012/069152
§ 371 (c)(1),
(2) Date: Mar. 28, 2014

(87) PCT Pub. No.: WO2013/045593
PCT Pub. Date: Apr. 4, 2013

(65) Prior Publication Data
US 2014/0233841 A1 Aug. 21, 2014

(30) Foreign Application Priority Data
Sep. 30, 2011 (FR) ...................................... 11 58800

(51) Int. Cl.
*G06T 7/00* (2006.01)

(52) U.S. Cl.
CPC ............... *G06T 7/0004* (2013.01); *G06T 7/001* (2013.01)

(58) Field of Classification Search
CPC combination set(s) only.
See application file for complete search history.

(56) References Cited

U.S. PATENT DOCUMENTS

| 2005/0052637 A1 | 3/2005 | Shaw et al. | ................. 356/35.5 |
| 2013/0129182 A1 | 5/2013 | Noyel | ......................... 382/141 |

FOREIGN PATENT DOCUMENTS

FR 2 959 046 A1 10/2011

OTHER PUBLICATIONS

Deng_yuan, Huang. Recognition of Tire Tread Patterns Based on Gabor Wavelets and Support Vector Machine. Kaohsiung Taiwan: Computational Collective Intelligence. Technologies and Applications Lecture Notes in Computer Science, 2010. Accessed Aug. 21, 2015. http://link.springer.com/chapter/10.1007%2F978-3-642-16696-9_11#.*

(Continued)

*Primary Examiner* — Utpal Shah
*Assistant Examiner* — Kate R Duffy
(74) *Attorney, Agent, or Firm* — Fitzpatrick, Cella, Harper & Scinto

(57) ABSTRACT

A tire appearance detection method includes:
  capturing an original grey-level image of an inner surface of a tire, and transforming the original image into an orthonormal space with an x-axis (OX) representing a circumferential direction and with a y-axis (OY) representing a radial direction;
  applying a series of filters to the original image, to obtain a multivariate image;
  splitting the multivariate image according to a predefined tiling in axial and circumferential directions, to obtain multivariate sub-images of the inner surface of the tire;
  transforming each of the multivariate sub-images into one-dimensional vectors using selected descriptors, to obtain a simplified multivariate image of the inner surface of the tire;
  transforming the simplified multivariate image into a common reduced factorial space; and
  locating sub-images of the inner surface of the tire containing an anomaly using a classifier suitable for identifying an area of the common reduced factorial space containing an anomaly.

12 Claims, 3 Drawing Sheets

(56) References Cited

OTHER PUBLICATIONS

Zanella, U.S. Appl. No. 14/112,452, filed Mar. 21, 2012.
Zanella, U.S. Appl. No. 14/112,448, filed Mar. 21, 2012.
Zanella, U.S. Appl. No. 14/112,460, filed Mar. 21, 2012.
Noyel, U.S. Appl. No. 14/118,598, filed May 10, 2012.
Noyel, U.S. Appl. No. 14/118,612, filed May 10, 2012.
Noyel, U.S. Appl. No. 14/348,209, filed Sep. 27, 2012.
P. Chen et al., "Inspection of Tire Tread Defects Using Image Processing and Pattern Recognition Techniques," Proceedings of SPIE, vol. 2063, pp. 14-21 (Sep. 9, 1993).
I.K. Fodor, "A Survey of Dimension Reduction Techniques," U.S. Department of Energy, UCRL-ID-148494, pp. 1-24 (May 9, 2002).
D. Colbry et al., "Pattern Recognition for Classification and Matching of Car Tires," Tire Science and Technology, pp. 1- 18 (Jan. 1, 2003).
A.K. Jain et al., "Statistical Pattern Recognition: A Review," IEEE Transactions on Pattern Analysis and Machine Intelligence, vol. 22, No. 1, pp. 4-37 (Jan. 1, 2000).

* cited by examiner

METHOD OF CHECKING THE APPEARANCE OF THE SURFACE OF A TYRE

FIELD OF THE INVENTION

The invention relates to the field of manufacture of tyres and more particularly the operations of checking the inner appearance of the surface of a tyre using automatic means intended to assist the operators responsible for performing these operations.

RELATED ART

The grey level image of the internal surface of the tyre is obtained using conventional means. These means may be of the type enabling a grey level image to be obtained.

This image is then processed in order to extract from it the maximum of information likely to result in the detection of an anomaly.

The patent application filed under no. FR 10/52951 and not published on the filing date of the present application describes a checking method in which a multivariate image of the original image is produced using a collection of morphological filters. Following reduction, the spectral image obtained is analysed by a suitable classifier sensitive to a particular anomaly.

BRIEF DESCRIPTION OF EMBODIMENTS OF THE INVENTION

The present invention is a refinement of the above method which is intended to improve the computing time required to process the image, taking advantage of the specific features of the inner surface of a tyre and the relevance of the results obtained.

In order to facilitate the removal of the air trapped between the curing membrane and the internal surface of the tyre, the curing membrane actually comprises relief patterns such as regular grooves forming a given angle with the radial direction, or flecks forming non-periodic, random structured patterns. These patterns are reproduced in depressed form on the internal surface of the tyre.

The anomalies present on the inner surface of the tyre then appear on a textured base, the shape, proportion and arrangement characteristics of which nevertheless remain identifiable.

It is also observed that the boundaries of these anomalies can no longer be defined in a precise manner, and that a classification of each of the pixels of the image, as described in the patent application cited above, becomes difficult to carry out in this context.

The object of the method according to the invention is to provide solutions to all of the problems posed above, and includes the steps during which:
  the grey level original image of said surface is captured and transformed into an orthonormal space in which the x-axis (OX) represents the circumferential direction, and the y-axis (OY) represents the radial direction,
  the original image is transformed using a predetermined series of filters to obtain a multivariate original image,
  a tiling is predefined in the axial and circumferential directions in such a way as to split the multivariate original image into multivariate sub-images,
  each of the multivariate sub-images is transformed into one-dimensional vectors using a given descriptor, in such a way as to obtain a simplified multivariate image formed from the collation of said vectors,
  the number of dimensions of the simplified multivariate image data is reduced using a data analysis tool,
  in the reduced factorial space, the distribution of the sub-images containing an anomaly is evaluated in relation to the distribution of the sub-images containing no anomalies in order to assess the separating power of the descriptor concerned.

The image can also be captured using a sensor capable of evaluating the relief of the surface, and, to each pixel of the image, a grey level value proportional to the topographical elevation of this point is assigned in order to obtain a two-dimensional original image.

In order to lessen the effects of the lighting variations during the capture, a pre-processing of the image can be carried out, such as, for example, a polynomial interpolation of the grey levels by line or by column.

The series of filters is preferably formed from morphological operators of the swelling, wear, opening or closure type, or residuals of one or more of these operations.

The tiling of the sub-images is preferably carried out in the circumferential and radial directions in such a way that said sub-images have the shape of a square.

The surface of the sub-images will then be adjusted in such a way that it is greater by a factor of between five and ten times the Representative Elementary Surface (RES) of the textured base of a tyre comprising no anomalies.

In practice, the sides of the square of the sub-image are preferably formed by a number of pixels corresponding to a length of between $0.01*\Phi$ and $0.1*\Phi$, $\Phi$ to being the diameter at the seat of the tyre to be checked.

The data analysis tool is preferably chosen from one of the following factorial analysis tools:
  principal component factorial analysis (PCA),
  correspondence factorial analysis (CFA),
  independent component analysis (ICA)

In order to select the relevant descriptors, one of the above methods is applied as many times as necessary by choosing the descriptor from one of the following descriptors:
  the histogram of the grey levels,
  the covariance of the grey levels in the circumferential direction or the radial direction,
  by line or by column, the mean, the variance, the standard deviation, the extreme values, the deviation at maximum or minimum amplitude, the mean positive or negative crossing of the grey levels in the circumferential or radial direction.

Advantageously, after having selected the descriptors, the reduced factorial spaces of each of the descriptors of which the separating power has been evaluated as relevant are combined into a common reduced factorial space.

As seen above, the method according to the invention includes a learning phase during which relevant descriptors are selected for the anomalies which are intended to be detected, and a checking phase during which the inner surface of a tyre will be analysed using these relevant descriptors in order to determine the presence or absence of anomalies.

The method of checking the inner surface of any given tyre then provides the steps during which:
  the grey level image of the inner surface of a tyre to be checked is captured and this original image is transformed into an orthonormal space in which the x-axis (OX) represents the circumferential direction, and in which the y-axis (OY) represents the radial direction,
  the predetermined series of filters is applied to the original image of the inner surface of the tyre to be checked in order to obtain a multivariate original image, the multivariate original image is split according to the predefined tiling in the axial and circumferential directions, in such a way as to obtain multivariate sub-images of the inner surface of the tyre to be checked, each of the multivariate sub-images is transformed into one-dimensional vectors, using each of the selected descriptors, in such a way as to obtain a simplified multivariate image of the inner surface of the tyre to be checked, the simplified multivariate image is transformed into the common reduced factorial space, the sub-images of the inner surface of the tyre to be checked containing an anomaly are located using a classifier suitable for identifying the areas of the common reduced factorial space containing the anomalies.

The classifier is advantageously constructed using one of the following analysis tools:

Linear Discriminant Analysis (LDA),

Separators with Vast Margins (SVM).

By splitting the original image into sub-images of reduced size corresponding more or less to the size of the anomalies which are intended to be detected, and by reducing these sub-images using the descriptor chosen according to its ability to handle cases of structured bases, then by applying more conventional dimension-reduction methods, the applicant has demonstrated that it was possible to detect most of the anomalies present on the surface of a tyre such as marks, air holes or positioning irregularities of the carcass reinforcement ply threads.

BRIEF DESCRIPTION OF THE DRAWINGS

The description which follows is based on FIGS. 1 to 6, in which.

DETAILED DESCRIPTION OF EMBODIMENTS OF THE INVENTION

Figure 1:
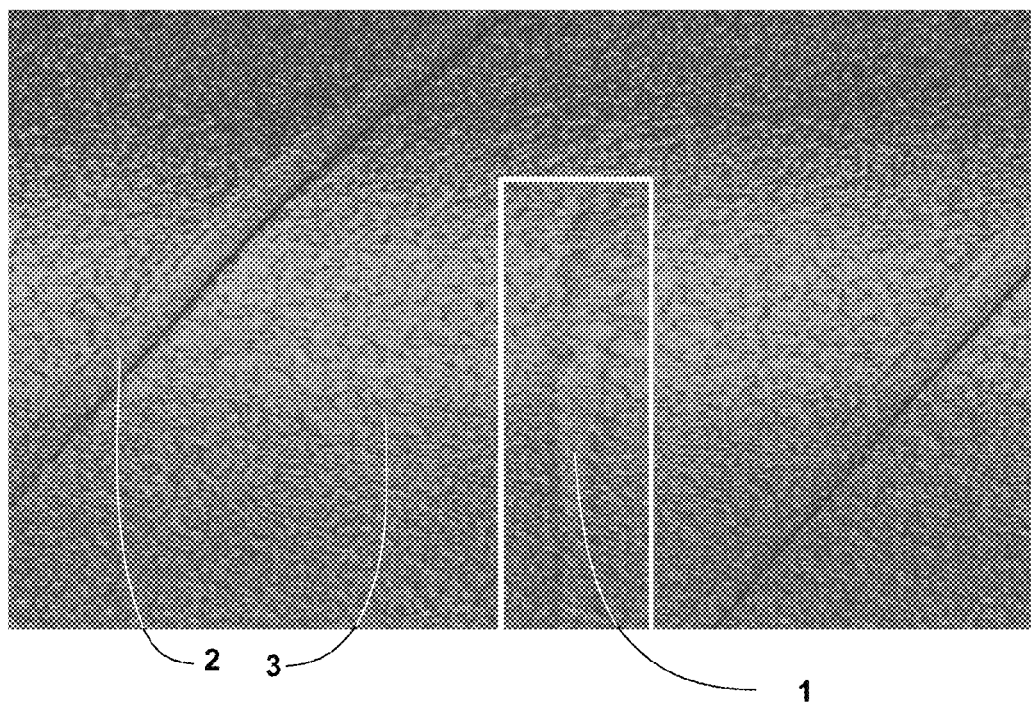
FIG. 1 shows a grey level image of the inner surface of a tyre containing an anomaly.
Figure 2:
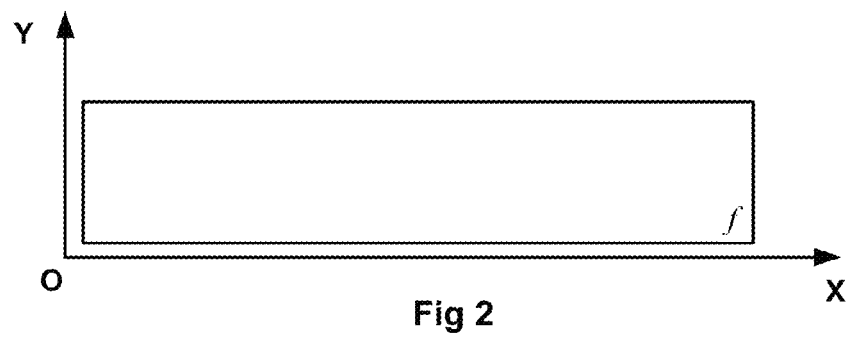
FIG. 2 shows a schematic view of the image of the expanded inner surface in an orthonormal reference.

FIG. 1 shows a grey level image of the inner surface of a tyre. An anomaly 1 linked to an irregularity of the threads of the carcass reinforcement ply which stands out from the structured base containing grooves 2 and flecks 3 can clearly be distinguished.

The grey level may quite simply be the result of the level of reflection of the luminous intensity as is the case in FIG. 1. In this case, a traditional camera will be used.

It is also possible to produce a three-dimensional topographical image of the surface of the tyre using, for example, means based on the principle of optical triangulation, implementing a 2D sensor coupled to a laser lighting source. This image is then converted into a two-dimensional grey level image in which a so-called grey level value is associated with any point, i.e. with any pixel of the image, representing the altitude of this point in relation to the surface. This grey level value may usefully be coded on 8 or 16 bits, or even 32 bits for better dynamics. For 8-bit coding, the value 255 (white) corresponds to the highest altitude and the value 0 (black) corresponds to the lowest altitude.

It may prove useful to apply a pre-processing of the original image to remove the imperfections of the image linked to the lighting variations during the capture, or to extract the regular patterns such as the grooves.

By way of example, it will be possible to carry out a polynomial interpolation on the grey level averages by processing the line profiles and the column profiles separately. Compensation for drift is obtained by subtracting the values of the polynomial obtained line-by-line and column-by-column. This method enables the image to be smoothed while retaining the strong local features.

In all cases, the application of the method according to the invention does not differ according to whether a two-dimensional grey level image is involved or an image of which the grey levels reflect the altitude of the points of the surface.

For reasons of convenience and simplification of the calculations, the image originating from the sensor is transformed into an expanded image in an orthonormal reference OXY in such a way that the circumferential coordinates are carried by the x-axis and the radial coordinates are carried by the y-axis OY. The grey level original image is denoted f.

Tyres including areas where one or more previously referenced and identified anomalies appear are preferably selected during the learning phase. It will also be observed that it is possible at this stage to manually embed areas including anomalies taken from images captured on different tyres.

The following step of the method consists in transforming the original image using a predetermined series of N filters $F_1^f, F_2^f, \ldots F_N^f$, in such a way as to extract the information contained in the texture of the image.

These filters may equally be morphological operators. A morphological operator is understood here to mean operations such as wear or swelling which consist, for each point of an image, in looking for the minimum or maximum grey level value of the adjacent points included inside a structuring element, with a given shape and surface, defining an adjacency of the point to be analysed. For a case of wear, the value at this point then becomes the minimum value, and for a swelling, the value at this point becomes the maximum value. The combination of wear followed by a swelling is referred to as an opening, and the combination of a swelling followed by wear is referred to as a closure. These operations may be combined in series. Similarly, the residuals of these operations can be used to perform operations. Small-size, linear structuring elements oriented in the circumferential direction OX or in the radial direction OY will preferably be chosen.

Figure 3:
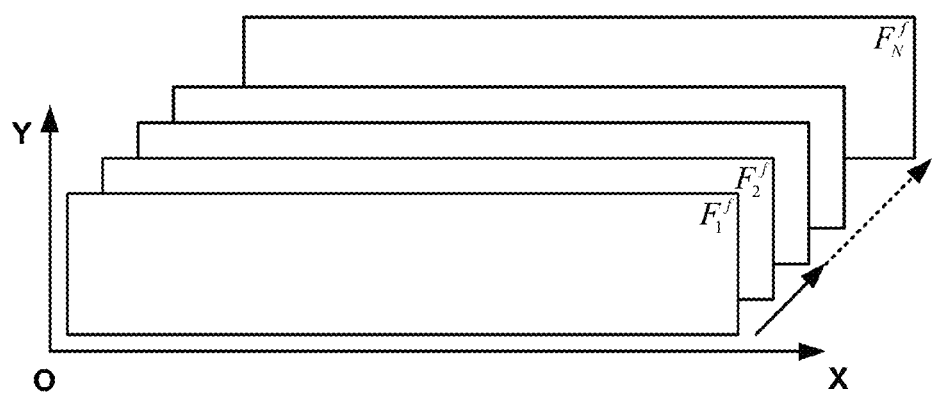
FIG. 3 shows a schematic view of the multivariate image obtained following application of a series of filters.
Figure 4:
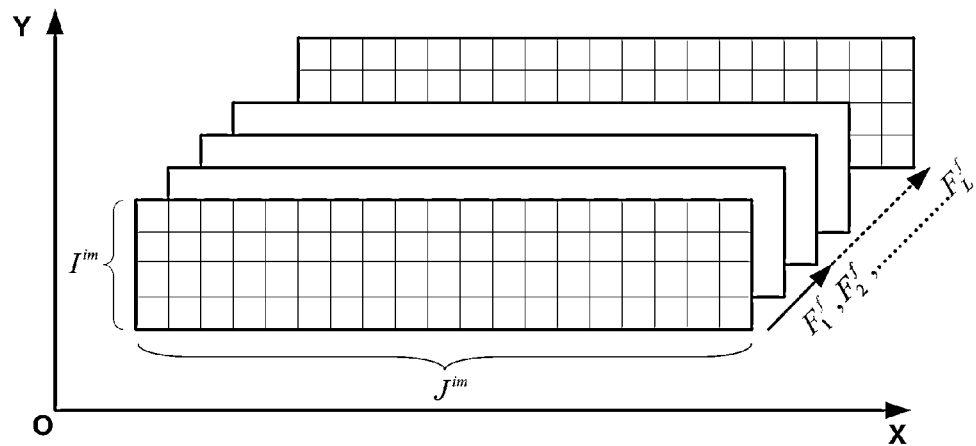
FIG. 4 shows a schematic view of the splitting of the image shown in FIG. 3 into multivariate sub-images.

The result of the application of each of these filters on the original image f provides a new grey level image $F_1^f, F_2^f, \ldots F_N^f$, and the superimposition of these 2D images, which all contain the same number of pixels, forms a multivariate image as shown in FIG. 3.

A vector (spectrum) $F^f(x_i)$ which is identical in size for all pixels $x_i$, $i \in P$ is associated with each pixel $x_i$ of the image f.

$F^f(x_i)$ is the response of a pixel to the collection of filters:

$$F^f(x_1): \begin{cases} E \to T^L \\ x_1 \to F^f(x_1) \end{cases}$$

$$\vdots$$

$$F^f(x_i): \begin{cases} E \to T^L \\ x_i \to F^f(x_i) \end{cases}$$

$$\vdots$$

$$F^f(x_P): \begin{cases} E \to T^L \\ x_P \to F^f(x_P) \end{cases}$$

The following step then consists in reducing the size of this multivariate image. To do this, a tiling is defined in the axial and circumferential dimensions delimiting the boundaries of sub-images of reduced size in the 2D space formed by the image f or by one of the images of the image f after filtering, $F_1^f, F_2^f, \ldots F_N^f$.

The size of the grids of the tiling is adjusted in a manner suitable for the dimension of the tyre to be inspected, and must be defined in such a way as to contain enough information to recognize the anomalies which are intended to be detected. An Elementary Representative Surface (ERS) on the clean base which corresponds to the average surface of the finest textured elements such as the flecks 3 shown in FIG. 1 is thus evaluated. This result may be obtained by calculating, using a covariance function, the characteristic size of the elements of the texture, which is expressed in the form of the expected value of the product of the image with its transform by a vector h from which the mean of the image squared is subtracted.

$$C(\vec{h}) = E(I(x) \cdot I(h+\vec{h})) - m^2$$

These calculations result in the definition of an ERS between 0.5 mm² and 4 mm², or between 20×20 and 50×50 pixels, for a passenger vehicle tyre dimension of 17" in diameter. It is also arranged for the surface of the sub-images to be slightly greater than or equal to the mean surface of the anomalies. By choosing sub-images of which the side is at least four times greater than the value of the ERS, it is also checked that the anomalies concerned intersect the boundaries of the sub-images, and that the dimensions of these anomalies do not allow a sub-image to be totally included in an anomaly.

In practice, the sub-images have a square shape of 256×256 pixels for the above-mentioned tyre dimension, which corresponds to a value between 0.01 Φ and 0.1 Φ, Φ being the diameter at the seat of the tyre to be checked.

The multivariate image is then represented in the form of the juxtaposition of the $I^{im} \times J^{im}$ sub-images forming each channel $F_n^f$ of the multivariate image.

The multivariate image is denoted:

$$\{W_{F_n}^k\}_{k=1\ldots I^{im} \times J^{im}}.$$

$I^{im} \times J^{im}$ being the number of sub-images.

The following step of carrying out the method according to the invention provides for the association with each of these multivariate sub-images of a 1D vector corresponding to the transformation of this multivariate sub-image using a descriptor. The aim of this step is to reduce the dimension of the multivariate image for the purpose of searching for the descriptors most likely to respond to the presence of a surface anomaly without losing the information contained in the image to be analysed. This operation enables the information contained in a sub-image to be concentrated for the purpose of its subsequent processing.

A new simplified multivariate image is therefore obtained which is formed from the juxtaposition of the transformation by said descriptor of each of the sub-images contained in each of the images $F_1^f, F_2^f, \ldots F_N^f$ obtained by application of the filters of the series of selected filters.

Figure 5:
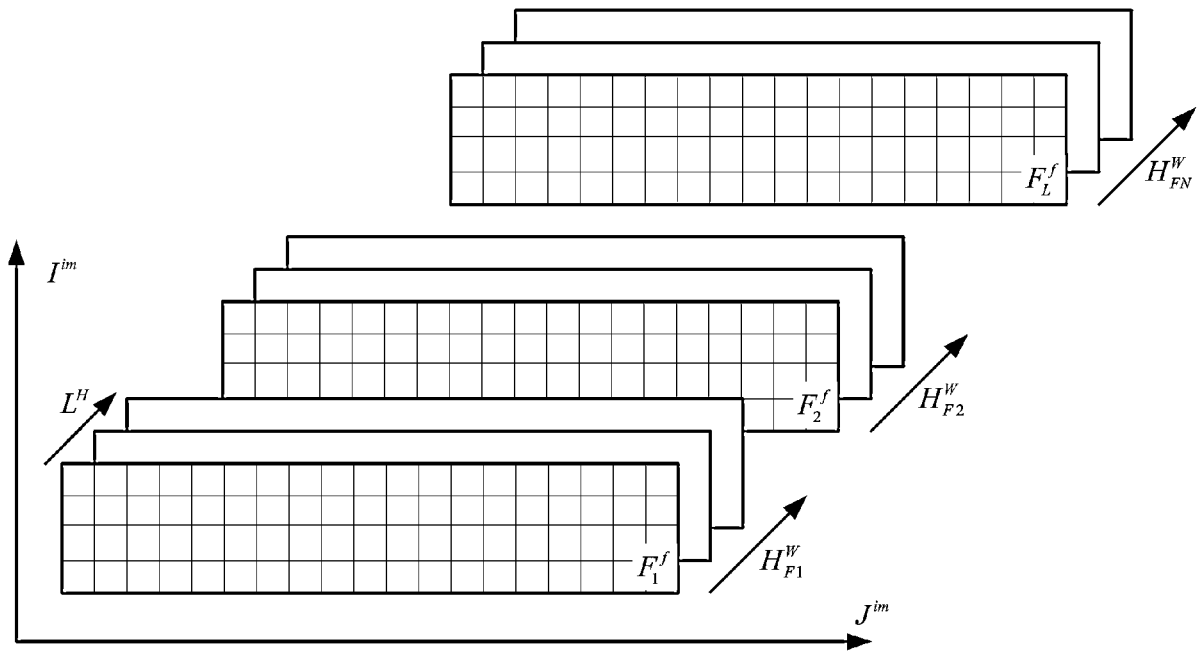
FIG. 5 shows a schematic view of the multivariate image obtained following transformation of each of the multivariate images by a descriptor.

The multivariate image obtained after transformation by the descriptors, as shown in FIG. 5, in which each square represents one pixel, is denoted $H^{W_F}$:

$$H^{W_F}: \begin{cases} D \to T^{NL^H} \\ W_F^k \to H^{W_F}(x_k) = [H^{W_{F_1}}(x_k), H^{W_{F_2}}(x_k), \ldots, H^{W_{F_N}}(x_k)] \end{cases}$$

where:

$D \in R^2$, D is the support space of a 2D image $F_i^f$ of dimension $I_m \times J_m$ $T \subset R$, and $T^{NL^H} = N(T \times T \times \ldots \times T)$, where $L^H$ is the dimension of the image space $T^{L^H}$ of the transformation of a sub-image belonging to an image $F_i^f$, and N the number of filters $x_k \in D$, a pixel of the multivariate image obtained by transformation of the sub-images into vectors.

$H^{W_F}(x_k)$ is therefore a descriptor of the multivariate sub-image $W_F^k$. It is a vector of the space $T^{NL^H}$.

The choice of the descriptor is of course of great importance. They must in fact be suitable for the processing of structured images.

The object of the invention is therefore to propose descriptors which have been judged to be the most effective in analysing the inner surface of tyres. The descriptor will preferably be chosen from the following operators, the definitions of which will be briefly repeated below:

Histogram of the Grey Levels.

The histogram of the grey levels of an image is a function which gives the occurrence (or the frequency) of appearance of each grey level in the image.

$$H^{W_{F_M}}(x_k) = (u_0, u_1, \ldots, u_m, \ldots, u_M)$$

where $u_m$ is the number of occurrences of the grey level m in the sub-image $W_F^k$. For an 8-bit image, the grey levels range from 0 to M=255.

The multivariate sub-image associated with this descriptor is denoted:

$$H^{W_F}(x_k) = [H^{W_{F_1}}(x_k), H^{W_{F_2}}(x_k), \ldots, H^{W_{F_N}}(x_k)]$$

Circumferential Covariance

A sub-image $W_{F_n}^k$ is considered as the implementation of a statistical variable. The circumferential covariance of this sub-image is the statistical expectation of the product of this sub-image $W_{F_n}^k(i, j)$ by its transform in the circumferential direction $W_{F_n}^k(i, j+h)$.

$$G^{W_{F_n}}(x_k) = E[W_{F_n}^k(i, j) \cdot W_{F_n}^k(i, j+h)],$$

where $(i,j) \in R^2$ is the position of a pixel of the sub-image.

The value of h preferably varies from 0 to 60 pixels. The multivariate sub-image associated with this descriptor is denoted:

$$G^{W_F}(x_k) = [G^{W_{F_1}}(x_k), G^{W_{F_2}}(x_k), \ldots, G^{W_{F_N}}(x_k)]$$

Radial Covariance

A sub-image $W_{F_n}^k$ is considered as the implementation of a statistical variable. The radial covariance of this sub-image is the statistical expectation of the product of this sub-image $W_{F_n}^k(i,j)$ by its transform in the radial direction $W_{F_n}^k(i+h, j)$:

$$K^{W_{F_n}}(x_k) = E[W_{F_n}^k(i,j) \cdot W_{F_n}^k(i+h, j)]$$

where $(i,j) \in R^2$ is the position of a pixel of the sub-image. The value of h preferably varies from 0 to 60 pixels. The multivariate sub-image to this descriptor is denoted:

$$K^{W_F}(x_k) = [K^{W_{F_1}}(x_k), K^{W_{F_2}}(x_k), \ldots, K^{W_{F_N}}(x_k)]$$

Means and Variances by Line or by Column in the Radial or Circumferential Directions For each of the lines $i=i_n$ of the sub-image $W_{F_n}^k$, the following are calculated:
  the standard deviation: $\Delta_{i=i_n} = E(W_{F_n}^k(i=i_n, j) - E[(W_{F_n}^k)])$.
  the variance: $V_{i=i_n} = E[(W_{F_n}^k(i=i_n, j) - E[(W_{F_n}^k(i=i_n, j)])^2]$.
A profile (i.e. a vector) of the standard deviations $\Delta_i$ and the variances $V_i$ in the circumferential direction is therefore obtained.

For each of the columns $j=j_n$ of the sub-image $W_{F_n}^k$, the following are calculated:
  the standard deviation: $\Delta_{j=j_n} = E(W_{F_n}^k(i,j=j_n) - E[W_{F_n}^k(i,j=j_n)])$.
  the variance: $V_{j=j_n} = E[(W_{F_n}^k(i,j=j_n) - E[(W_{F_n}^k(i,j=j_n)])^2]$.
A profile (i.e. a vector) of the standard deviations $\Delta_j$ and the variances $V_j$ in the radial direction is therefore obtained.

For the signal (i.e. the vector) corresponding to the standard deviations line-by-line $\Delta_i$ and column-by-column $\Delta_j$: the following are calculated:
  the standard deviation: $\sigma[\Delta_i] = E[(\Delta_i - E[\Delta_i])^2]$, $\sigma[\Delta_j]$
  the extreme values: minima and maxima: $\min(\Delta_i)$, $\max(\Delta_i)$, $\min(\Delta_j)$, $\max(\Delta_j)$
  the deviation at maximum amplitude: $\zeta(\Delta_i) = 2 \times \sigma(\Delta_i) - |\max(\Delta_i) - \min(\Delta_i)|$, $\zeta(\Delta_j)$ The Mean Positive or Negative Crossing The mean positive crossing for a threshold fixed at $s = 2 \times \sigma$ ($\Delta_i$):

$$tr_{s=2\sigma(\Delta_i)}(\Delta_i) = \frac{\text{card}(T_s[\Delta_i])}{\text{card}(\text{connex}(T_s[\Delta_i]))},$$

$$tr_{s=2\sigma(\Delta_j)}(\Delta_j)$$

where:
$T_s[\Delta_i]$ is the binary signal thresholded at the value s, card is the cardinal of a discrete set, and connex are the non-zero connected components of the binary signal after thresholding.

The mean negative crossing for a threshold fixed at $s=-2 \times \sigma(\Delta_i)$:

$$tr_{s=-2\sigma(\Delta_i)}(\Delta_i), tr_{s=-2\sigma(\Delta_j)}(\Delta_j).$$

Standard Deviations, Extreme Values and Mean Positive or Negative Crossings of the Variance Values by Line or by Column in the Radial or Circumferential Directions For the signal (i.e. the vector) corresponding to the variance line-by-line $V_i$ and column-by-column: the following are calculated:
  the standard deviation: $\sigma[V_i]$, $\sigma[V_j]$
  the extreme values: minima and maxima: $\min(V_i)$, $\max(V_i)$, $\min(V_j)$, $\max(V_j)$
  the mean: $E[V_i]$, $E[V_j]$
  the mean positive crossing: $tr_{s=2\sigma(V_i)}(V_i)$, $tr_{s=2\sigma(V_j)}(V_j)$
  the mean negative crossing: $tr_{s=-2\sigma(V_i)}(V_i)$, $tr_{s=-2\sigma(V_j)}(V_j)$ The object of the following steps of the method according to the invention is to finalize the learning phase and assess the separating power of the chosen descriptor.

For this purpose, a known data-reduction method is carried out, which is applied to the simplified multivariate image obtained after transformation of the multivariate original image split into sub-images using the descriptor.

The factorial methods used for the multivariate analysis enable not only the most faithful possible representation in a sub-space of reduced dimension (for example in 2 or 3 dimensions) of the individuals of a population, in the present case the sub-images, but also the detection of the links between the variables and also the variables most effectively separating the individuals. These methods employ linear algebra and are used as a tool for reducing the dimensions of a problem which allows the number of variables studied to be reduced while retaining the maximum amount of information. More details can usefully be obtained by consulting the publications by Salporta in 2006, by Crucianu, Asselin de Beauville & Bone in 2004 or by Hastie, Tibshirani & Friedman in 2001.

This essentially involves an investigation of the reduced factorial space in which the projection of the simplified multivariate image contains a sufficient quantity of information to assess the separating power of the descriptor.

From these methods, the following methods will preferably be selected, the principles of which will be briefly repeated below.

Principal Component Analysis (PCA)

It is assumed that n is the number of sub-images and p the dimension of the variables (total dimension of the descriptor concerned). Each datum is represented in a space having p dimensions, and the totality of the data forms a "cloud of n points" in $R^p$. The principle of PCA is to obtain an approximate representation of the cloud in a sub-space having a smaller dimension k, through projection on carefully chosen axes. Using a Euclidean metric $R^p$ (normalized by using reduced centred variables), the k principal axes are those which maximize the inertia of the projected cloud, i.e. the weighted average of the squares of the distances of the projected points at their centre of gravity. The axes defined by the PCA are orthogonal. The principal components are the n vectors having as coordinates those of the orthogonal projections of the n elements of the cloud on the k principal axes. Unlike the original variables, these new coordinates are two-by-two uncorrelated. It is possible to consider only a reduced number of axes which represent a large part of the variance of the data (for example 90% of the total inertia). The choice of the number of axes to be considered can be made in different ways.

Correspondence Factorial Analysis (CFA)

Correspondence factorial analysis is equivalent to a double PCA carried out on the columns and on the lines, but using another metric different from that of the PCA, i.e. the Chi2 distance. This distance allows two modalities of the same variable A to be compared by comparing their relative frequencies over all of the modalities of a different variable. This analysis is highly effective for positive variables such as histograms. It has in fact been designed to analyse empirical frequencies corresponding to probability laws.

Discriminant Analysis (DA)

This is a supervized analytical method. It uses the knowledge of the distribution into classes of sub-images for the purpose of creating new variables through linear combination of the initial variables to best explain the allocation to classes defined a priori. It is both a descriptive and a predictive method which, as with PCA and CFA, results in calculations of principal axes. It can be seen as an extension of the multiple regression in the case where a variable to be explained is nominal (the class of the sub-images comprising an anomaly, or those considered as normal) and comprises a partition variable.

It consists in determining factors through linear combinations of the descriptive variables, which assume the closest possible values for elements of the same class, and the most distant between elements of different classes. This entails breaking down the total variance as the sum of the intra-class and inter-class variances, and seeking to maximize their ratio.

Figure 6:
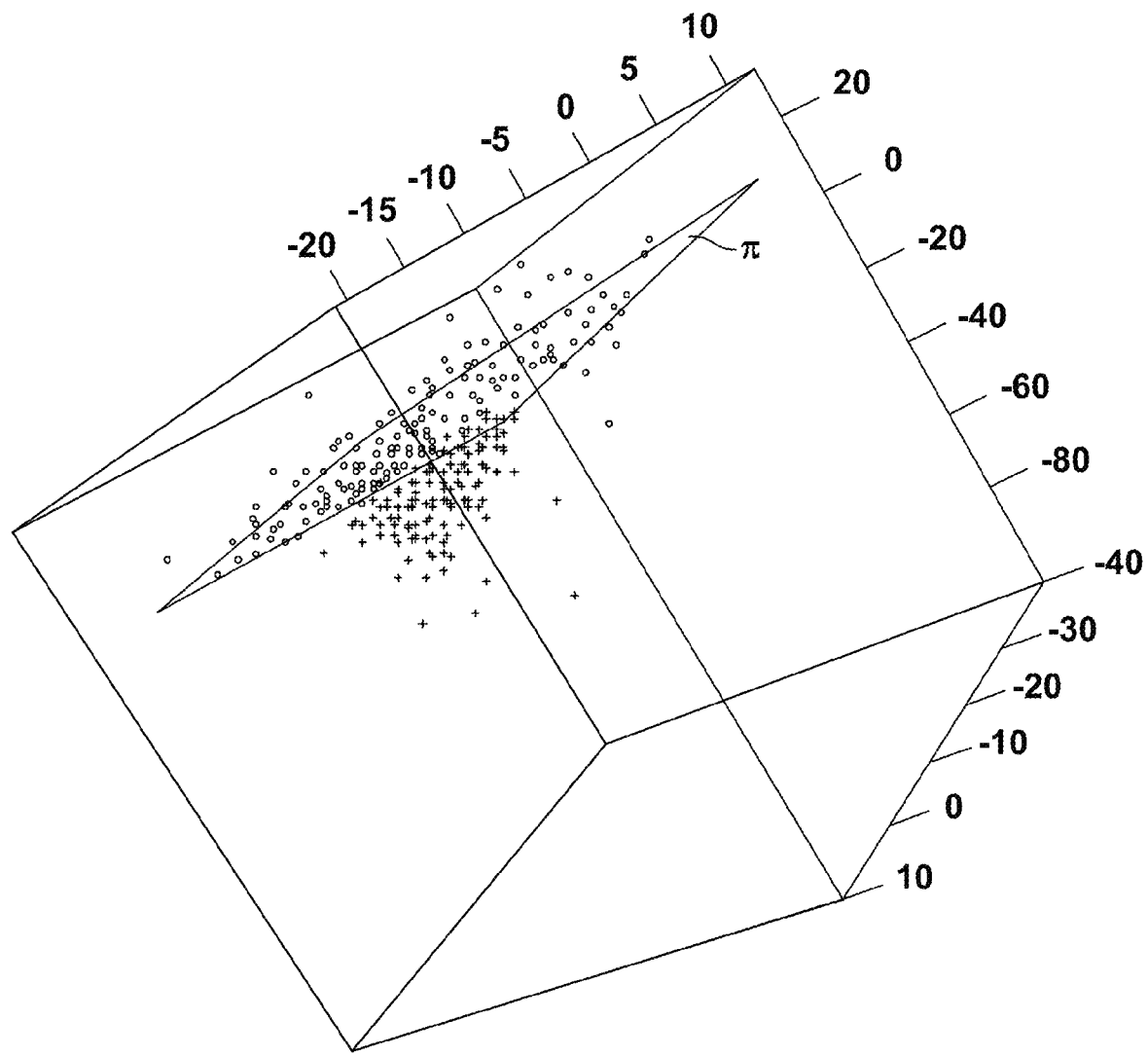
FIG. 6 shows a 3D graph of the position of the sub-images in a reduced factorial space.

FIG. 6 shows an example of the result obtained. In this case, the descriptor used is the measurement of the radial covariance of each of the sub-images of the base. The Principal Component Analysis applied to these data enables the importance of the factorial axes to be ranked according to the inertia of the cloud of points in relation to these axes. The inertias of the first factorial axes are as follows: 42.3%, 19.1%, 7.5%, 5.3%, 4.8%, 4.1%, 3.3%, 3.1%, 2.3%, 1.9%. As a result, the analysis of the first 10 factorial axes can be considered as sufficient, since it comprises 93.7% of the information.

FIG. 6 shows the projection of the sub-images in the space of the first three axes of the PCA of the vertical covariance. Although these factorial axes show only 68.9% of the total inertia, an interesting distribution of the sub-images is observed. The sub-images without anomalies, represented by crosses, in fact form a quite homogeneous group in this space, whereas the sub-images which have defects, of the type shown in FIG. 1 and represented by circles, have a much sparser distribution. Furthermore, a separating hyperplane $\pi$ seems to exist between the two groups of sub-images. This descriptor therefore appears to provide interesting information in relation to the classification of the sub-images into two groups.

The learning phase continues in an iterative manner by applying the method described above, as many times as necessary, to the broadest possible collection of images containing anomalies, in such a way as to select the descriptors having the best separating power.

Once the descriptors H, G, . . . N have been selected, it is possible to combine the reduced factorial spaces obtained during the selection of a descriptor into a single common reduced factorial space.

As seen in the example above, it is also recommended at this stage to classify the factorial axes $\Delta_i$ according to their decreasing inertia in relation to the cloud of points formed by the multivariate image in the reduced factorial space. Only the factorial axes of which the sum of the inertias represents, for example, 80% of the total inertia are then retained.

The combination of the factorial spaces into a single space is much simpler if the variables are standardized in these spaces. The canonical metric of the factorial spaces is the Euclidean metric. Furthermore, this is the metric which is used in most classifiers.

The combination of the multivariate spectral images $c^{H^{WF}}$, $c^{G^{WF}}$, . . . $c^{N^{WF}}$ into a single multivariate spectral image is effected by stacking the channels of the images one behind the other:

$$c: \begin{cases} E \to T^{K^{HWF}} \times T^{K^{GWF}} \times \ldots \times T^{K^{NWF}} \\ x \to c(x) = \left(c_1^{H^{WF}}(x), c_2^{H^{WF}}(x), \ldots, c_{K_{HWF}}^{H^{WF}}(x), c_1^{G^{WF}}(x), \ldots, c_{K_{GWF}}^{G^{WF}}(x), \ldots, c_1^{N^{WF}}(x), \ldots, c_{K_{NWF}}^{N^{WF}}(x)\right) \end{cases}$$

It is also possible at this stage to move on directly to the classifier construction step, which consists in determining the areas of the factorial space in which the pixels considered as forming the image of the anomaly are located in a statistically significant manner.

The method then provides for the construction of a classifier that will enable detection of the presence (or absence) and also the position of an anomaly. The classifier enables isolation of certain areas of the common reduced spectral space in which the clouds of points corresponding to the spectral image of the sub-images including an anomaly and the clouds of points corresponding to sub-images containing no anomalies are located in a significant manner.

A first method consists in applying an analytical method based on linear discriminant analysis (LDA). The aim of this analytical method is to separate classes of points by hypersurfaces of which the dimension is equal to the number of classes minus one, by assuming that the distribution of the points in a class is Gaussian. This works well in very many cases, even if the points of the classes do not entirely have a Gaussian distribution. LDA can of course be used in multi-dimensional spaces.

Separators with Vast Margins may also be appropriate. These tools make up a set of supervized learning techniques intended to resolve discrimination and regression problems. SVMs are a generalization of linear classifiers. SVMs will be used to solve discrimination problems, i.e. to decide on the class to which a new sub-image belongs. This classification method can be seen as a generalized discriminant analysis. It is carried out in two steps: a non-linear transformation enables the transition from the original space of the descriptors to a space having a greater dimension and provided with the scalar product. In the new space, a search is carried out for the linear separator $f(x)=ax+b$ satisfying the two conditions: it clearly separates the two groups, and is the most distant possible of all the observations. The solution $f(x)$ is therefore expressed as a function of the scalar products x.x'. Following transformation $\phi$ it is expressed as a function of the scalar product $K(x,x')=\langle \phi(x)|\phi'(x)\rangle$, where K is referred to as the core. The calculation times can vary significantly according to the choice of the core, but the SVMs allow a variety of problems to be modelled.

The detection of an anomaly on the surface of any tyre to be sorted then becomes possible by using the calculation tools and the method as described above.

In a first step, the digital grey level image of the surface of the tyre that is intended to be sorted is captured and this original image is transformed into an orthonormal space in which the x-axis (OX) represents the circumferential direction, and the y-axis (OY), The predetermined series of filters $F_1^f, F_2^f, \ldots F_L^f$ is then applied to the original image of the inner surface of the tyre to be checked in order to obtain a multivariate original image.

The multivariate original image is split according to the predefined tiling in the axial and circumferential directions, in such a way as to obtain multivariate sub-images of the inner surface of the tyre to be checked, and each of the channels of the multivariate sub-images is transformed into one-dimensional vectors using each of the selected descriptors H, G, ... N, in such a way as to obtain a simplified multivariate image of the inner surface of the tyre to be checked.

The simplified multivariate image is transformed into the common reduced factorial space: $c^{H^{WF}}, c^{G^{WF}}, \ldots c^{N^{WF}}$.

And the sub-images of the inner surface of the tyre to be checked containing an anomaly are located using the classifier.

The invention claimed is:

1. A method of detecting an anomaly on an internal surface of a tyre through digital processing of an image of the internal surface of the tyre, the method comprising steps of:
    capturing a grey-level original image (f) of the internal surface of the tyre and transforming the original grey-level image into an orthonormal space, in which an x-axis (OX) represents a circumferential direction, and in which a y-axis (OY) represents a radial direction;
    transforming the original grey-level image using a predetermined series of filters ($F_1^f, F_2^f, \ldots F_L^f$), to obtain a multivariate original image;
    splitting the multivariate original image into multivariate sub-images ($W_F^k$), to obtain predefined tiling in the axial direction and the circumferential direction;
    transforming each of the multivariate sub-images is transformed into one-dimensional vectors using a given descriptor (H, G, ... N), to obtain a simplified multivariate image ($K^{W_F}, G^{W_F} \ldots, H^{W_F}$) formed from a collation of the vectors;
    reducing a number of dimensions of the simplified multivariate image data using a data analysis tool, to obtain a reduced factorial space; and,
    in the reduced factorial space, evaluating a distribution of sub-images containing an anomaly in relation to a distribution of sub-images containing no anomaly, in order to assess a separating power of the given descriptor.

2. The method according to claim 1,
    wherein the original grey-level image is captured using a sensor capable of evaluating a relief of the surface, and
    wherein the method further comprises a step of, for each pixel of the original grey-scale image, assigning a grey-level value proportional to a topographical elevation of a point corresponding to the pixel, to obtain a two-dimensional original image.

3. The method according claim 1, further comprising a step of, after the step of capturing the grey-level image, carrying out a pre-processing of the grey-level image using a polynomial interpolation of grey levels by line or by column, in order to lessen effects of lighting variations during capture of the grey-level image.

4. The method according to claim 1, wherein the series of filters is formed from morphological operators corresponding to swelling, wear, opening, and closure operations, or from residuals of one or more of the operations.

5. The method according to claim 1, wherein the tiling is performed in the circumferential direction and the radial direction in such a way that the multivariate sub-images have a shape of a square.

6. The method according to claim 5, wherein a surface of the multivariate sub-images is greater, by a factor of between five and ten times, than a Representative Elementary Surface (RES) of a textured base of a tyre having no anomalies.

7. The method according to claim 6, wherein sides of a square of a multivariate sub-image are formed by a number of pixels corresponding to a length of between $0.01*\Phi$ and $0.1*\Phi$, with $\Phi$ corresponding to a diameter at a seat of the tyre.

8. The method according to claim 1, wherein the data analysis tool is chosen from a set of factorial analysis tools that include:
    a principal component factorial analysis (PCA) tool,
    a correspondence factorial analysis (CFA) tool, and
    a independent component analysis (ICA) tool.

9. The method according to claim 1, wherein a plurality of relevant descriptors is selected by performing the method multiple times utilizing a descriptor chosen from a set of descriptors that includes:
    a histogram ($H^{W_F}(x_k)$) of grey levels,
    a covariance $$\left(G^{W_{F_n}}(x_k), K^{W_{F_n}}(x_k)\right)$$

of the grey levels in the circumferential direction or the radial direction, and
    by line or by column, a mean, a variance, a standard deviation, extreme values, a deviation at maximum or minimum amplitude, a mean positive or negative crossing of the grey levels in the circumferential direction or the radial direction.

10. The method according to claim 9, wherein the reduced factorial spaces of the relevant descriptors of which the separating power has been evaluated are combined into a common reduced factorial space ($c^{H^{WF}}, c^{G^{WF}}, \ldots, c^{N^{WF}}$).

11. The method according to claim 10, wherein
    the grey-level original image (f) of the inner surface of a tyre is captured and is transformed into the orthonormal space in which the x-axis (OX) represents the circumferential direction and the y-axis (OY) represents the radial direction,
    the predetermined series of filters ($F_1^f, F_2^f, \ldots F_L^f$) is applied to the grey-level original image to obtain the multivariate original image,
    the multivariate original image is split according to the predefined tiling in the axial direction and the circumferential directions, to obtain multivariate sub-images ($W_F^k$) of the inner surface of the tyre,
    each of the multivariate sub-images is transformed into one-dimensional vectors, using each of the selected relevant descriptors (H, G, ... N), to obtain a simplified multivariate image of the inner surface of the tyre, the simplified multivariate image is transformed into the common reduced factorial space ($c^{H^{WF}}$, $c^{G^{WF}}$, ..., $c^{N^{WF}}$), and the sub-images containing an anomaly are located using a classifier suitable for identifying areas of the common reduced factorial space containing anomalies.

12. The method according to claim 11, wherein the classifier is constructed using a Linear Discriminant Analysis (LDA) analysis tool or a Separators with Vast Margins (SVM) analysis tool.

\* \* \* \* \*